UNITED STATES PATENT OFFICE.

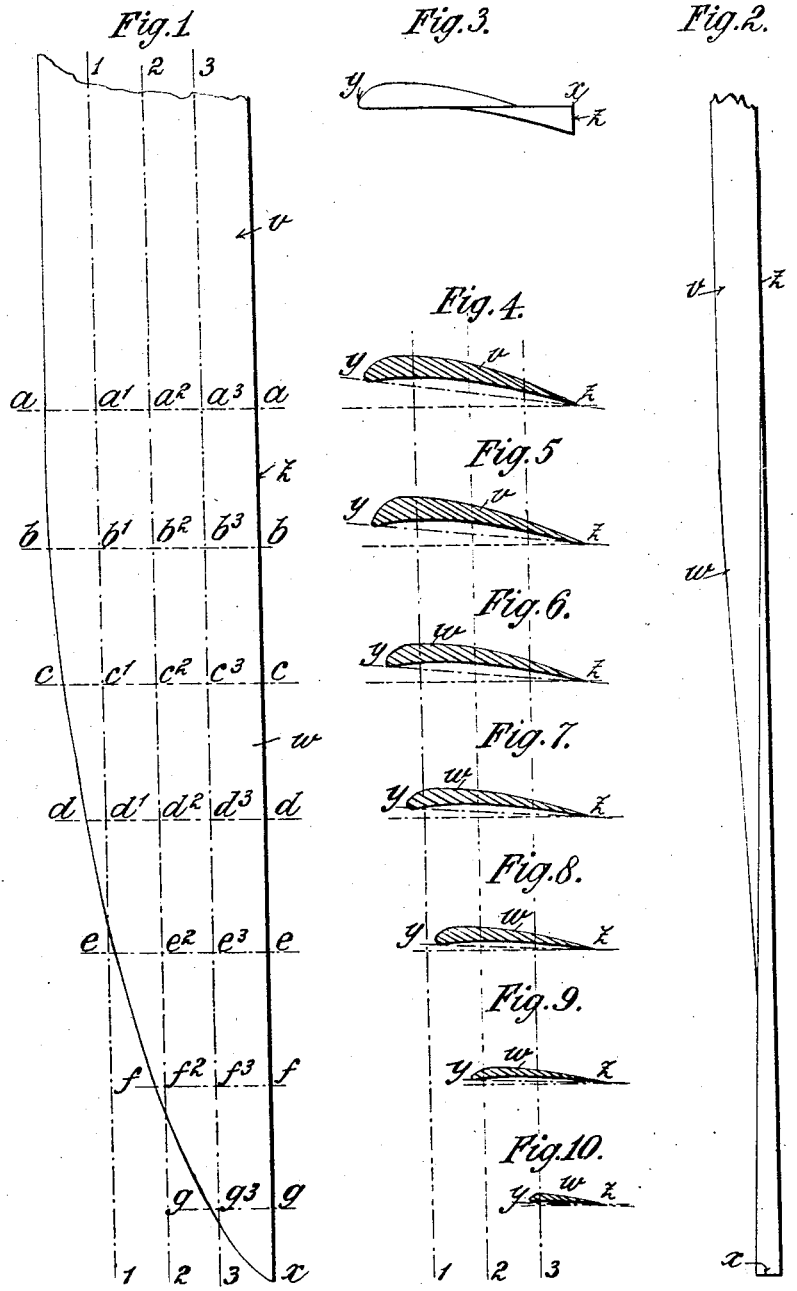

ALEXANDER ALBERT HOLLE, OF LONDON, ENGLAND.

AEROFOIL FOR AEROPLANES AND THE LIKE.

1,337,515.   Specification of Letters Patent.   Patented Apr. 20, 1920.

Application filed July 22, 1919. Serial No. 312,537.

*To all whom it may concern:*

Be it known that I, ALEXANDER ALBERT HOLLE, a subject of the Queen of the Netherlands, residing at 19 Half Moon street, London, England, have invented certain new and useful Improvements in Aerofoils for Aeroplanes and the like, of which the following is a specification.

This invention relates to the wings or aerofoils of aeroplanes and the like, and has for its object the prevention of air flow in a lateral direction in relation to the aerofoil and the insurance that the air flow over the whole area of the aerofoil is—when the aeroplane is flying with its main or central part at its optimum angle of efficiency—parallel to the direction of flight or "two-dimensional" as it is commonly called, by which means only is it possible to obtain maximum lifting power with maximum efficiency in wing action.

To attain this end it is necessary to insure that the pressures along the leading edge of the tips be graded down to zero at the trailing edge while at the same time both the positive and negative pressures which are also graded from the leading to the trailing edge shall be equal on lines at right angles to the line of motion, and that at any given velocity of translation the suction or negative pressure at any particular point shall exactly counter-balance the centrifugal momentum contained in the air when it passes said point. It is therefore of paramount importance that there is at any given velocity of flight a certain definite pressure along lines at right angles to the direction of flight, and if this is not so and there is on one or both sides of any point, say a lower degree of pressure, the air at said point instead of flowing rearward will tend to flow laterally toward the lower pressure where there is the greater suction or negative pressure. This upsets the balance of the centrifugal momentum so that the air flow will not follow the contour of the aerofoil. The result is loss of energy by reason both of the lateral motion of the air and of the reduction downward acceleration of the air.

In different aerofoils the optimum angle of incidence under conditions of two-dimensional flow must vary with the camber, *i. e.,* the greater the camber the larger the optimum angle of incidence. From this it follows that if the tip of an aerofoil is properly "washed out" the angles of incidence should decrease in a manner proportionate to the decreasing camber toward said tip and therefore in an efficiently "washed out" tip each cross sectional element will fly at its angle of optimum efficiency.

I therefore construct my improved aerofoil in the following manner:—The main or central part of each aerofoil is made of a rectangular or approximately rectangular shape, *i. e.* with the leading and trailing edge parallel or approximately so to one another and the curvature and angle of incidence of said main or central part are uniform throughout its width, *i. e.* its lateral length, both edges being so located in relation to the fuselage that they lie in a plâne at right angles, or approximately so, to the longitudinal axis of the machine and therefore to the line of flight; the outer lateral ends of the aerofoil are each graded by sweeping the leading edge backward until it meets the trailing edge so as to form a gradually reduced tip end; the upper and under surfaces of the graded outer or tip ends are made of the same cross sectional curvatures as the corresponding parts of the main or central part of the aerofoil on lines parallel to the leading and trailing edges of said main or central part of the aerofoils, *i. e.* on lines at right angles to the direction of flight; and the angle of incidence of each outer or tip end is graded in plan or gradually reduced from the main or central part to the extreme end of the tip part.

In order that this invention may be fully understood I will more particularly describe it making reference to the accompanying drawings which are diagrammatic and in which—

Figure 1 is a view in plan of the improved aerofoil.

Fig. 2 is a view in front elevation thereof.

Fig. 3 is a view in side elevation thereof, and

Figs. 4, 5, 6, 7, 8, 9, and 10, are views in transverse section on an enlarged scale on lines *a a; b b; c c; d d; e e; f f;* and *g g;* Fig. 1.

Throughout the views similar parts are marked with like letters of reference.

The main or central part *v* of the aerofoil which is of rectangular or approximately rectangular shape with the trailing edge $z$ parallel or approximately so with the leading edge $y$ has the lateral outer or tip end parts $w$ graded in plan, i. e. gradually reduced in length from the leading edge to the trailing edge until said edges meet at the extreme ends $x$ of the tip parts. The main or central part $v$ is cambered and has suitable curved upper and lower surfaces as shown in Fig. 3. The curvatures of the upper and lower surfaces of the tip parts $w$ are the same as that of the corresponding parts of the main part of the aerofoil, i. e. within any two transverse lines drawn parallel with the leading and trailing edges of the main part $v$ the curvatures of the upper and lower surfaces of the tip parts $w$ are the same as those of the main or central part $v$. For instance, the curvature of the upper and lower surfaces of the part $c^1$, $c^3$, of the tip parts $w$ of the aerofoil on line $c-c$ Fig. 1, as shown in Fig. 6 is exactly the same as the curvature of that part of the main part $v$ lying between the points $a^1$, and $a^3$, that is the points in the line $a-a$ where the lines 1 and 3 intersect it. The curvatures however of the tip parts $w$ of the aerofoil do not lie in the same plane or at the same angle as the corresponding parts of the main or central part $v$ as the angle of incidence of each of the tip parts $w$ is gradually reduced or "washed out" toward the extreme end of said tip part as shown in Figs. 5, 6, 7, 8, 9, and 10, the effect of which is to give a twist to each said tip part $w$ which brings the trailing edge of said tip parts into the same plane as the leading edge of said parts.

The same principle of construction is applicable whether the end parts of the aerofoils are graded in plan toward the trailing or the leading edge, or whether they are graded from both edges so that the tips lie between said edges.

By this construction air leakage at the lateral ends of the aerofoils is prevented so that the negative and positive pressures remain equal throughout the width of the aerofoils, (i. e. from tip to tip) at all points on any given line drawn parallel to the leading and trailing edges of the main or central part or parts of the aerofoil, i. e. at right angles to the line of flight, for instance the effective pressure is the same at points $a^3$, $b^3$, $c^3$, $d^3$, $e^3$, $f^3$, and $g^3$, on line 3, Fig. 1.

It must be understood that the term "angle of incidence" has been used for the sake of convenience because it is universally employed. It is, however, a very indefinite term many authorities differing as to how the angle of incidence of a given aero curve should be measured.

What I claim as my invention and desire to secure by Letters Patent is:—

1. An aerofoil of the cambered type for aeroplanes comprising a main or central part having the same curvature and the same angle of incidence throughout its lateral length, and a tip part the length of which is gradually reduced from the leading edge of the main or central part to its extreme end or tip the curvature of said tip part being at every point on any line parallel to the leading edge of the main or central part the same as the curvature of the main or central part on same line and the angles of incidence of said tip part being gradually reduced toward the extreme end or tip of said part.

2. An aerofoil of the cambered type for aeroplanes comprising a main or central part of rectangular shape adapted to be so located in relation to the fuselage of the machine that its leading and trailing edges lie in a plane at right angles to the longitudinal axis of the machine and therefore to the line of flight, and having the same curvature and the same angle of incidence throughout its lateral length, and tip parts the leading edge of each of which is swept back until it meets the trailing edge at its extreme end the curvature of each of said tip parts at every point being of the same curvature as the corresponding part of the main or central part measured from the trailing edge and the angles of incidence of each of said tip parts being gradually reduced toward its extreme end.

ALEXANDER ALBERT HOLLE